United States Patent [19] [11] 3,883,169
Fischbach [45] May 13, 1975

[54] HANDLE FOR POTS, PANS, AND THE LIKE
[75] Inventor: Wolfgang Fischbach, Daaden, Germany
[73] Assignee: Heinrich Baumgarten, Eisen- und Blechwarenfabrik, Siegen, Germany
[22] Filed: Dec. 26, 1973
[21] Appl. No.: 428,234

[30] Foreign Application Priority Data
Dec. 30, 1972 Germany............................ 2264244

[52] U.S. Cl.............................. 294/31 R; 16/114 A
[51] Int. Cl. ............................................ A47j 45/10
[58] Field of Search........ 294/27 R, 27 H, 30, 31 R, 294/33, 16; 16/110 R, 110 A, 110.5, 114 R, 114 A, 116 R; 220/94 R

[56] References Cited
UNITED STATES PATENTS
2,362,720  11/1944  Reichart........................... 294/31 R
3,065,016  11/1962  Serio.................................. 294/31 R
3,272,547  9/1966   Pryce................................. 294/31 R
3,285,648  11/1966  Pryce................................. 294/33 X
3,306,647  2/1967   Imhoff................................ 294/16

Primary Examiner—James B. Marbert
Assistant Examiner—Johnny D. Cherry
Attorney, Agent, or Firm—Woodhams, Blanchard & Flynn

[57] ABSTRACT

A handle construction for use with a pot. A supporting arm is secured to the pot and extends outwardly therefrom. The handle body of the handle has a cavity therein adapted to receive the supporting arm. A spring structure is provided to fasten the handle body without play to the supporting arm. The spring consists of a hairpin-shaped spring wire having resilient limbs which engage opposite sides of the cavity in the handle body. The spring wire has humps offset thereon and the free end of one of the limbs of the spring is bent outwardly and is adapted to be engaged by the handle body to secure the spring against displacement relative to the handle. The supporting arm has abutments thereon which are engaged by the spring humps to thereby limit the relative movement between the handle body and the supporting arm.

6 Claims, 7 Drawing Figures

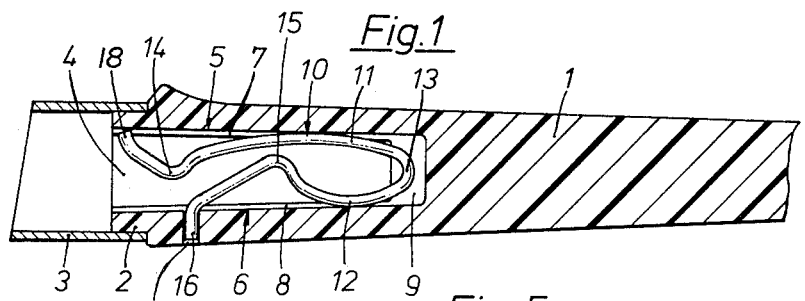
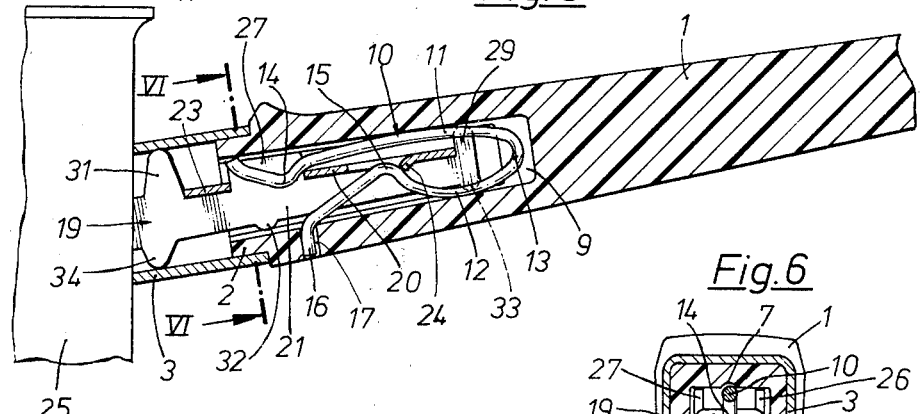
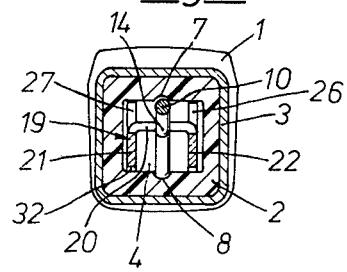
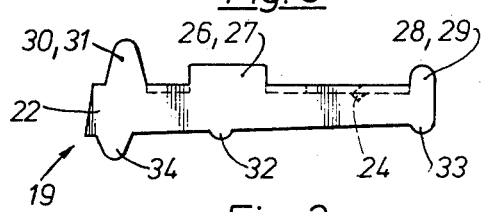
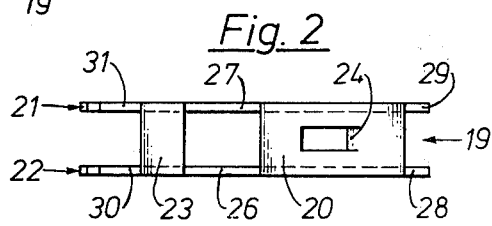
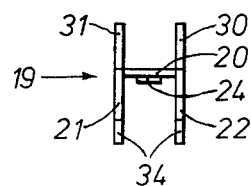
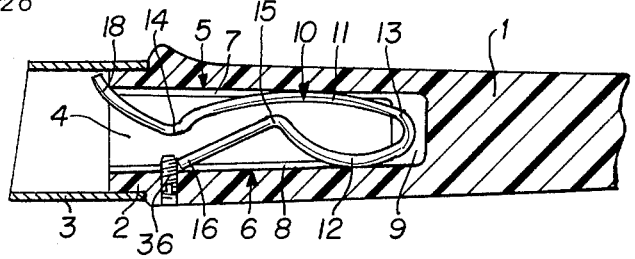

HANDLE FOR POTS, PANS, AND THE LIKE

FIELD OF THE INVENTION

This invention relates to a handle comprising a supporting arm arranged to be joined to a pot or the like, a handle body having a cavity to receive the supporting arm, and a spring arranged to clip and fasten the handle body without play on the supporting arm.

BACKGROUND OF THE INVENTION

When the handle body of handles of this kind are pushed onto the supporting arms which are fastened, preferably welded, to the pot or the like, the springs are clipped to the handle bodies and possibly also to the supporting arm. At the same time the springs are stressed and apply a force which presses the handle body against a stop formed by the supporting arm, with the object of eliminating the play between the handle body and supporting arm which is necessary for assembly purposes. The spring has the additional task of pressing the handle body, that is to say its end face, against the pot wall or the wall carrying the supporting arm. Experience has shown that with known handles or with known springs the forces necessary for ensuring connection without play of the handle body to the pot or supporting arm for a long period of time cannot be obtained.

It is a main object of the invention to construct a handle with which reliable seating of the handle body, without play over a long period of time, is achieved with the aid of a simple spring.

SUMMARY OF THE INVENTION

According to the invention there is provided a handle comprising a supporting arm arranged to be joined to a pot or the like, a handle body having a cavity to receive the supporting arm, and a spring arranged to clip and fasten the handle body without play on the supporting arm, wherein the spring consists of a hairpin-shaped spring wire or spring strip having resilient limbs which lie against opposite sides of said cavity and are provided with humps offset in relation to one another considered longitudinally of the spring, wherein the free end of one limb is bent over outwards and by location with a stop in the handle body secures the spring against displacement in the handle, wherein the supporting arm serves to stress the spring, and wherein the supporting arm is provided with abutments for the spring humps and with projections for supporting the handle and limiting the turning movement of the handle body and supporting arm in relation to one another.

In a handle as just set forth the spring is pressed with great force against the wall of the pot and a force couple of considerable magnitude is produced which ensures that the handle is completely without play.

BRIEF DESCRIPTION OF THE DRAWING

The invention will now be described, by way of example, with reference to the accompanying drawing, in which:

FIG. 1 is a section through a haft-type handle provided with a spring;

FIGS. 2, 3 and 4 are respectively a plan view, a side view, and an end view, to a reduced scale, of a supporting arm embodied in a handle according to the invention; and FIG. 5 is a section similar to FIG. 1, illustrating the connection of the handle onto a pot;

FIG. 6 is a section on the line VI—VI, FIG. 5, and

FIG. 7 is a modification of the embodiment illustrated in FIG. 1.

DETAILED DESCRIPTION

Referring to the drawing, FIG. 1 shows an ordinary haft-type handle body 1 of plastics material. The front end of the body is formed as a shoulder 2 to receive a sleeve 3, which in the usual way receives the front end of the handle when the handle is fastened to a pot. The handle body 1 is also provided with an elongated, axially directed cavity 4 of substantially rectangular cross-section, see FIG. 6. The top and bottom surfaces 5 and 6 of the cavity 4 have grooves 7 and 8, respectively, therein extending longitudinally thereof. The two grooves 7, 8 end in a transverse groove 9 at the end of the cavity 4 remote from the sleeve 3. The grooves serve to receive a spring, which is indicated generally by 10. The spring consists of a hairpin-shaped steel wire or strip. The spring has limbs 11 and 12 and a base 13. The limbs 11 and 12 are respectively provided with humps 14 and 15 which, as shown in FIG. 1, are offset in relation to one another considered longitudinally of the spring. Each hump is directed inwards of the spring, that is to say the apices of the humps face in opposite directions. The height of the humps is greater than one-half the height of the spring base 13, which latter is engaged in the transverse groove 9, that is to say the spring is secured against turning about its longitudinal axis.

The end 16 of the limb 12 is bent over outwards at an obtuse angle and is engaged in a recess 17 in the handle body 1. The bent-over portion 16 prevents the spring 10 from moving in the axial direction in relation to the handle body. The end 18 of the spring arm 11 lies in the groove 7. The end 18 may, however, be supported on the sleeve 3 as illustrated in FIG. 7 and thus at the same time serve to secure the sleeve on the handle.

As shown in FIGS. 2 to 4, a supporting arm 19 which is to fasten the handle to the pot or the like consists of a sheet metal part bent in H-shape and having two cross portions 20 and 23 and two limbs 21 and 22.

The portions of the supporting arm which lie between the cross portions 20 and 23 are divided and bent upwards, forming in the limbs 21, 22 projections 26, 27, 28, 29, 30 and 31. The cross portion 20 forms an abutment for the hump 14 and a tongue 24 is stamped out of the cross portion 20 and forms an abutment for the hump 15 of the spring 10. On their bottom edges the limbs 21, 22 form additional projections 32, 33, and 34. Together with the projections 26 to 29 the projections 32, 33 serve as abutments for the handle 1, that is to say they limit a turning movement of handle and pot in relation to one another. In conjunction with the projection 31 and 30 the projections 34 serve to secure the handle in the sleeve 3.

OPERATION

The operation of the device embodying the invention will be described in detail hereinbelow for a better understanding of the invention.

As FIG. 5 shows, the handle body 1 together with the sleeve 3 and the spring 10 is pushed onto the supporting arm 19, which has been welded on the pot 25, in such a manner that the limb 11 lies above and the limb 12 lies below the cross portions 20 and 23 of the supporting arm 19. When the handle body 1 is pushed on, the humps 14 and 15 of the spring are pressed in slightly, that is to say the spring limbs are stressed. A force component perpendicular to the arm 19 is produced at each hump. The two forces are directed oppositely and form a force couple which prevents relative turning movement of the part and the handle. In addition, to these forces, which are perpendicular to the supporting arm 19, there are produced at each hump force components which press the handle body 1 or the sleeve 3 against the wall of the pot. A connection which is permanently free of play is thus obtained.

The above described fastening is releasable. For this purpose, it is sufficient to press the end 16 of the spring limb 12 upwards with the aid of a tool. The end of the spring then jumps forward and the handle body can be pulled off the arm 19. In order to ensure ready detachability of the handle body, it is advisable for the recess 17 to be bounded at the front, in the direction of the pot, by a screw 36 (FIG. 7) screwed into the handle body. In this case the spring limb 12 lies against the screw. In order to detach the handle it is merely necessary for the screw to be screwed out of the handle body until the screw releases the end of the spring. The end of the spring then jumps forward and the handle body can be pulled off the arm 19. If this detachability is not desired, the recess 17 may be provided in the shoulder 2, in which it is then covered by the sleeve 3. The bent end 16 is then no longer accessible.

Play between the limbs 21, 22 of the supporting arm 19 and the neighbouring sides of the cavity 4 in the handle 1 has no effect in practice, since lateral movement of the handle 1 in relation to the supporting arm is eliminated by the bevelling of the interior space at the four corners. The use of the spring described is not limited to haft-type handles, but may also be used for loop-type handles and other forms of handle.

Although particular preferred embodiments of the invention have been disclosed above for illustrative purposes, it will be understood that variations or modifications thereof which lie within the scope of the appended claims are fully contemplated.

The embodiments of the invention in which an exclusive property or priviledge is claimed are defined as follows:

1. A handle for an object, comprising:
    a supporting arm secured to said object and extending outwardly therefrom, said supporting arm having abutment means and projection means thereon;
    a handle body having a cavity thereon adapted to receive said supporting arm therein;
    a generally U-shaped spring located in said cavity and being adapted to clip and fasten said handle body without play to said supporting arm, said spring consisting of a pair of flexible limbs which normally engage the interior surface of said cavity, said limbs having spring humps offset in relation to one another along the longitudinal length of said spring; and
    stop means on said handle body for engaging a free end of one of said limbs to prevent said spring from a longitudinal displacement relative to said handle body, said supporting arm being received in said cavity and between said limbs to effect a flexing of said limbs outwardly away from each other by engagement of said spring humps with said abutment means, said projection means engaging said interior surface of said cavity for supporting said handle and limiting the relative turning movement between said handle body and said supporting arm, the portion of said spring humps engaging said abutment means of said supporting arm effecting the application of an axial force to said handle body to urge said handle body toward said object.

2. A handle according to claim 1, wherein said interior surface of said cavity has a pair of opposed grooves therein extending longitudinally of said handle body; and
    wherein said limbs of said spring are located in said grooves;
    wherein another groove is located in said cavity at the end thereof remote from said object, said another groove extending transversely between and connecting said pair of grooves, a base of said spring connecting said limbs being located in said another groove in said handle body.

3. A handle according to claim 1, wherein said supporting arm consists of a sheet metal part bent in H-shape when viewed from a longitudinal end thereof.

4. A handle according to claim 1, wherein another free end of the other of said limbs of said spring is engageable with a sleeve disposed between said object and said handle body for the purpose of securing said sleeve to said handle body.

5. A handle according to claim 1, wherein said stop means is formed by a bore passing through a wall of said handle body extending into said cavity and said one free end of said one of said limbs is received in said bore.

6. A handle according to claim 1, wherein said stop means is defined by a screw screwed into said handle body.

* * * * *